United States Patent
Aiba et al.

(10) Patent No.: US 8,063,861 B2
(45) Date of Patent: *Nov. 22, 2011

(54) IMAGE DISPLAY UNIT

(75) Inventors: Hideki Aiba, Moriya (JP); Kenji Kubota, Yokohama (JP)

(73) Assignee: Victor Company of Japan, Limited, Yokohama, Kanagawa-ken (JP)

( * ) Notice: Subject to any disclaimer, the term of this patent is extended or adjusted under 35 U.S.C. 154(b) by 810 days.

This patent is subject to a terminal disclaimer.

(21) Appl. No.: 12/155,172

(22) Filed: May 30, 2008

(65) Prior Publication Data

US 2008/0238847 A1   Oct. 2, 2008

Related U.S. Application Data

(63) Continuation of application No. 10/959,078, filed on Oct. 7, 2004, now Pat. No. 7,400,321.

(30) Foreign Application Priority Data

Oct. 10, 2003  (JP) .................................. 2003-351736
Nov. 18, 2003  (JP) .................................. 2003-387660

(51) Int. Cl.
  *G09G 3/36* (2006.01)
(52) U.S. Cl. ........................... 345/87; 345/204; 345/691
(58) Field of Classification Search ............... 345/87, 345/204, 691
  See application file for complete search history.

(56) References Cited

U.S. PATENT DOCUMENTS

| 5,408,265 | A | * | 4/1995 | Sasaki | ............................. 348/70 |
| 5,448,307 | A | * | 9/1995 | Gelissen et al. | ............. 348/584 |
| 5,739,804 | A | * | 4/1998 | Okumura et al. | ............... 345/99 |
| 5,771,333 | A | * | 6/1998 | Hirayama et al. | ............ 386/201 |
| 6,151,075 | A | * | 11/2000 | Shin et al. | ..................... 348/459 |

(Continued)

FOREIGN PATENT DOCUMENTS

| JP | 64-064480 A | 3/1989 |
| JP | 04-288589 A | 10/1992 |
| JP | 06-237396 A | 8/1994 |
| JP | 07-123361 A | 5/1995 |

OTHER PUBLICATIONS

Kurita, T., "Fundamental Deterioration of Picture Quality for Moving Images Displayed on LCDs and Methods for Improvement" *The Institute of Electronics, Information and Communication Engineers: Technical Report of IEICE*, EID2000-47 pp. 13-18, (2000). (Japanese language Article, English Abstract provided).

*Primary Examiner* — Bipin Shalwala
*Assistant Examiner* — Afroza Chowdhury
(74) *Attorney, Agent, or Firm* — The Nath Law Group; Jerald L. Meyer; Jiaxiao Zhang

(57) ABSTRACT

An active matrix type display panel is a hold type display panel which has a plurality of pixels arranged in a matrix form, and holds and displays an electrical signal pixel by pixel for a predetermined time. A frame rate conversion circuit converts a video signal having a first vertical frequency (60 Hz) into a video signal having a second vertical frequency (120 Hz) which is m/n-fold (wherein m is an integer of 2 or more, n is an integer of 1 or more, and conditions of m>n are satisfied) of the first vertical frequency. A time base emphasizing circuit subjects an output from the frame rate conversion circuit to time base emphasis. A drive circuit displays the video signal having the second vertical frequency in a display panel.

2 Claims, 10 Drawing Sheets

U.S. PATENT DOCUMENTS

| | | |
|---|---|---|
| 6,304,990 B1 * | 10/2001 | Shikakura et al. ............ 714/747 |
| 6,408,265 B1 * | 6/2002 | Schultz et al. ................. 703/22 |
| 6,448,307 B1 * | 9/2002 | Medoff et al. ................ 523/129 |
| 6,509,930 B1 * | 1/2003 | Hirano et al. ................ 348/452 |
| 6,739,804 B1 * | 5/2004 | Haun ......................... 405/195.1 |
| 7,006,157 B2 * | 2/2006 | Sohn ............................. 348/699 |
| 7,400,321 B2 * | 7/2008 | Aiba et al. .................... 345/204 |
| 2004/0213470 A1 * | 10/2004 | Sato et al. .................... 382/239 |

* cited by examiner

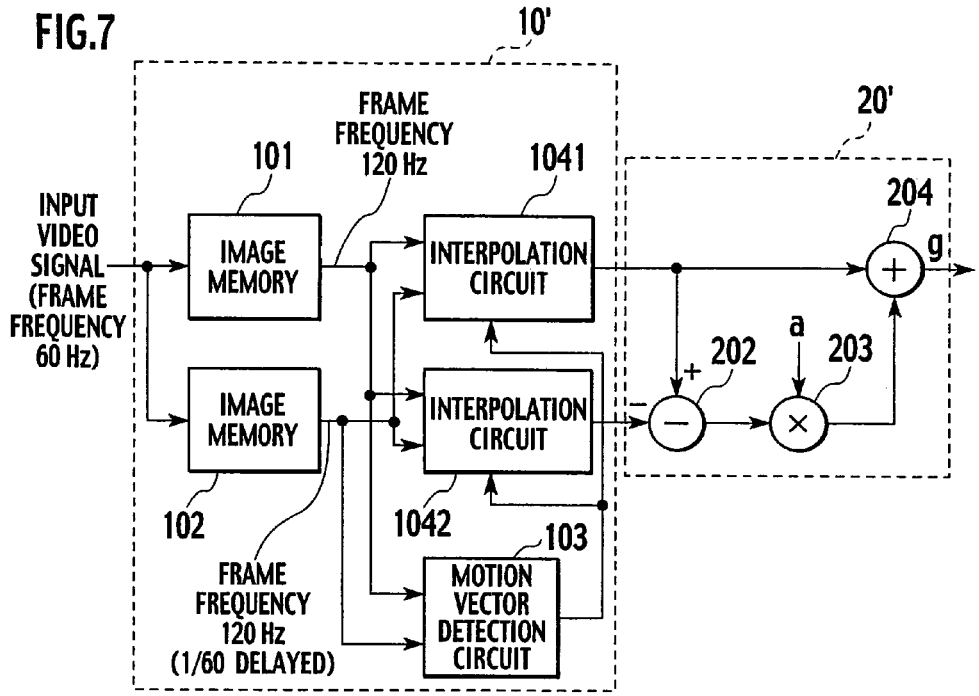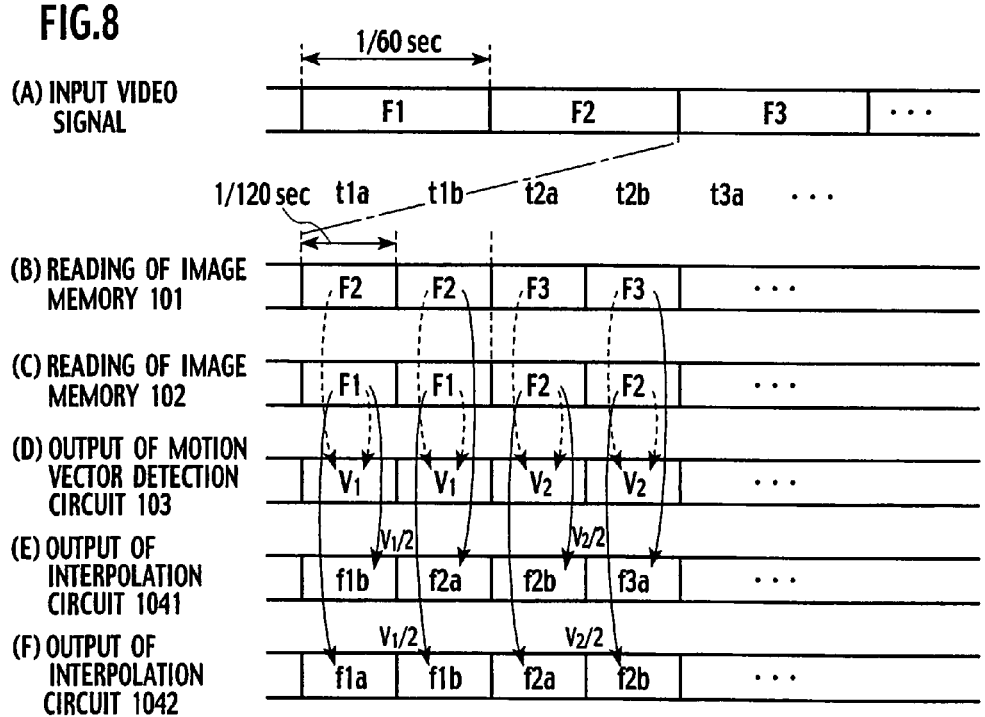

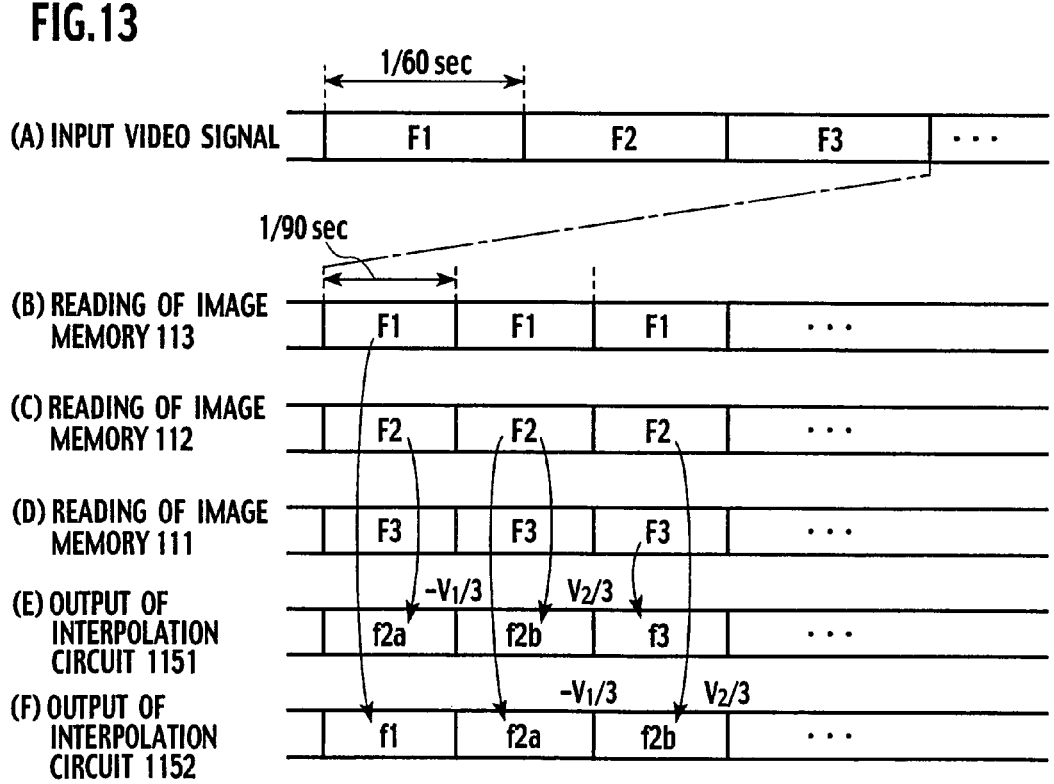

IMAGE DISPLAY UNIT

CROSS-REFERENCE TO PRIOR APPLICATIONS

This is a Continuation Patent Application of U.S. patent application Ser. No. 10/959,078 filed Oct. 7, 2004 which claims priority to Japan Application 2003-351736, filed Oct. 10, 2003 and Japan Application 2003-387660, filed Nov. 18, 2003, the entire contents of which are hereby incorporated by reference in their entirety.

BACKGROUND OF THE INVENTION

1. Field of the Invention

The present invention relates to a hold type image display unit as typified by a liquid crystal display unit, and more particularly, it relates to an image display unit which can reduce blurriness of a moving image.

2. Description of the Related Art

As image display units, there are an impulse type display unit which strongly emits light in a moment that an image is written like a display unit using a cathode ray tube (CRT), and a hold type display unit which holds display from writing of an image to writing of an image of a next frame like an active matrix type display unit having a memory function per each pixel. As the active matrix type display unit, there is a liquid crystal display unit using a thin-film transistor (TFT). In the liquid crystal display unit, an image written in a pixel by a TFT and a capacitor arranged for each pixel is held for a fixed time.

Since a response speed of the liquid crystal display unit is slow, the liquid crystal display unit has a problem that an after-image is generated when a moving image is displayed. As a one of methods which can suppress this problem, there is a method using a filter which emphasizes a video signal in a direction of the time base (time base emphasizing circuit).

The hold type display unit such as a liquid crystal display unit, however, cannot solve blurriness (which will be referred to as a moving image blur) of a moving image caused due to an influence of a visual system integration owing to hold display itself even if a response speed of the liquid crystal is increased.

This problem and its solution are described in "Fundamental Deterioration of Picture Quality for Moving Images Displayed on LCDs and Methods for Improvement" by Taiichiro Kurita, Technical Report of IEICE EID2000-47 (2000-09), p. 13-18. It is to be noted that a moving image blur is not restricted to the liquid crystal display unit, and it is likewise generated in an active matrix type display unit even if this display unit is an organic electroluminescence display unit. As solutions of the moving image blur, the above-mentioned reference describes a first method which shortens a hold time and approximates it to that in display of an impulse type display unit, and a second method which increases a frame frequency of an input video signal having a frame frequency of 60 Hz to a twofold value which is 120 Hz by motion compensating means.

The first method has a drawback (first problem) that means for shutting a backlight in synchronization with a video signal is required and display without flicker which is an advantage of the hold type display is deteriorated. The second method has an disadvantage (second problem) that a sampling frequency of a video signal and a writing speed of the liquid crystal must be respectively doubled in order to double a frame frequency, which imposes a great burden on an operating speed of a circuit or a connection interface between circuits, thereby involving an actual difficulty.

SUMMARY OF THE INVENTION

In view of the above-described drawbacks, it is an object of the present invention to provide an image display unit which can reduce moving image blurriness without impairing an advantage of the hold type display which can perform display without flicker.

Further, it is another object of the present invention to provide an image display unit which has a smaller burden on an operating speed of a circuit or a connection interface between circuits when reducing moving picture blurs, and which can be readily realized.

To this end, there is provided an image display unit using an active matrix type display panel which has a plurality of pixels arranged in a matrix form, and holds and displays an electrical signal pixel by pixel for a predetermined time, comprising: a rate conversion circuit which converts a video signal having a first vertical frequency into a video signal having a second vertical frequency which is m/n-fold (wherein m is an integer of 3 or more, n is an integer of 2 or more, and conditions that m>n, and m/n is not an integer are satisfied) of the first vertical frequency, and outputs the converted signal; and a drive circuit which displays the video signal having the second vertical frequency output from the rate conversion circuit in the active matrix type display panel.

In a preferred embodiment according to the present invention, the image display unit further comprises a time base emphasizing circuit which emphasizes a high-zone component in a direction of the time base by using image data corresponding to at least two adjacent frames in the video signal having the second vertical frequency output from the rate conversion circuit, wherein the drive circuit receives the video signal whose high-zone component in the direction of the time base is emphasized by the time base emphasizing circuit.

In the preferred embodiment according to the present invention, m=3 and n=2.

In the preferred embodiment according to the present invention, the second vertical frequency is 100 Hz or less.

In the preferred embodiment according to the present invention, a sampling frequency (vertical frequency×vertical line number×horizontal pixel number) of the video signal having the second vertical frequency is 100 Hz or less.

To achieve the above-described object, there is provided an image display unit using an active matrix type display panel which has a plurality of pixels arranged in a matrix form, and holds and displays an electrical signal pixel by pixel for a predetermined time, comprising: a rate conversion circuit which converts a video signal having a first vertical frequency into a video signal having a second vertical frequency which is m/n-fold (wherein m is an integer of 2 or more, n is an integer of 1 or more, and conditions of m>n are satisfied) of the first vertical frequency, and outputs the converted signal; a time base emphasizing circuit which emphasizes a high-zone component in a direction of the time base by using image data corresponding to at least two adjacent frames in the video signal having the second vertical frequency output from the rate conversion circuit; and a drive circuit which displays the video signal having the second vertical frequency output from the rate conversion circuit in the active matrix type display panel.

In a preferred embodiment according to the present invention, the rate conversion circuit comprises: an image memory which writes the video signal having the first vertical frequency and outputs the written video signal as the video signal having the second vertical frequency; a motion vector detection circuit which detects a motion vector by using image data output from the image memory; and first and second interpolation circuits which perform motion compensation interpolation by using the image data output from the image memory and the motion vector, and output respective image data each being a video signal having the second vertical frequency and shifted as much as one frame from the other, and the time base emphasizing circuit emphasizes the high-zone component in the direction of the time base by using the respective image data output from the first and second interpolation circuits as the image data corresponding to the at least two adjacent frames.

In the preferred embodiment according to the present invention, the rate conversion circuit comprises: an image memory which writes the video signal having the first vertical frequency and outputs the written video signal as the video signal having the second vertical frequency; a motion vector detection circuit which detects a motion vector by using image data output from the image memory; an interpolation circuit which performs motion compensation interpolation by using the image data output from the image memory and the motion vector, and outputs the video signal having the second vertical frequency; and first and second selectors which output respective image data each being shifted as much as one frame from the other by selectively outputting the image data output from the image memory and the image data output from the interpolation circuit, and the time base emphasizing circuit emphasizes the high-zone component in the direction of the time base by using the respective image data output from the first and second selectors as the image data corresponding to the at least two adjacent frames.

The nature, principle and utility of the invention will become more apparent from the following detailed description when read in conjunction with the accompanying drawings.

BRIEF DESCRIPTION OF THE DRAWINGS

In the accompanying drawings:

FIG. 7 is a partial block diagram showing a second embodiment of the image display unit according to the present invention;

FIG. 8 is a timing chart illustrating an operation of 15 the second embodiment;

FIG. 13 is a timing chart illustrating an operation of the fourth embodiment.

DESCRIPTION OF THE PREFERRED EMBODIMENTS

An image display unit according to the present invention will now be described hereinafter with reference to the accompanying drawings.

First Embodiment

Figure 1:
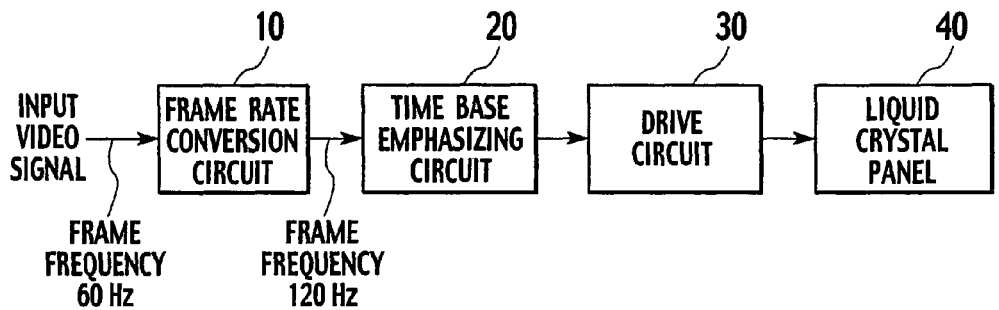
FIG. 1 is a block diagram showing a first embodiment of an image display unit according to the present invention.

FIG. 1 is a block diagram showing a first embodiment of an image display unit according to the present invention.

The first embodiment solves the first problem mentioned above. In FIG. 1, a video signal is input to a frame rate conversion circuit 10. The frame rate conversion circuit 10 converts a frame frequency (vertical frequency) of the input video signal into a doubled frequency, and outputs the converted signal. In the first embodiment and second and third embodiments which will be described later, the frame frequency of the input video signal (original signal) is converted into a m/n-fold frequency. Here, m is an integer of 2 or more, n is an integer of 1 or more, and conditions of m>n are satisfied. In the first to third embodiments, m=2 and n=1 are achieved, and the frame frequency 60 Hz of the input video signal is converted into 120 Hz.

Incidentally, in regard to a video signal subjected to 2:1 interlace at a frame frequency of 30 Hz, it is assumed that this signal is converted into a sequentially scanned video signal having a frame frequency of 60 Hz by sequential scanning conversion in advance. A concrete structure and operation of the frame rate conversion circuit 10 will be described later.

The video signal having the frame frequency of 120 Hz output from the frame rate conversion circuit 10 is input to a time base emphasizing circuit 20. The time base emphasizing circuit 20 emphasizes a high-zone component of the input video signal in a direction of the time base, and outputs the emphasized component. Concrete structures and operations of the frame rate conversion circuit 10 and the time base emphasizing circuit 20 will be described later. The video signal output from the time base emphasizing circuit 20 is input to a drive circuit 30, and the drive circuit 30 drives a liquid crystal panel 40 as an example of a hold type display unit (display panel) in order to display the video signal having the frame frequency of 120 Hz. The display panel is not restricted to the liquid crystal panel, and it is possible to employ an active matrix type display panel which has a plurality of pixels arranged in a matrix form and holds and displays an electrical signal in accordance with each pixel for a predetermined time.

Figure 2:
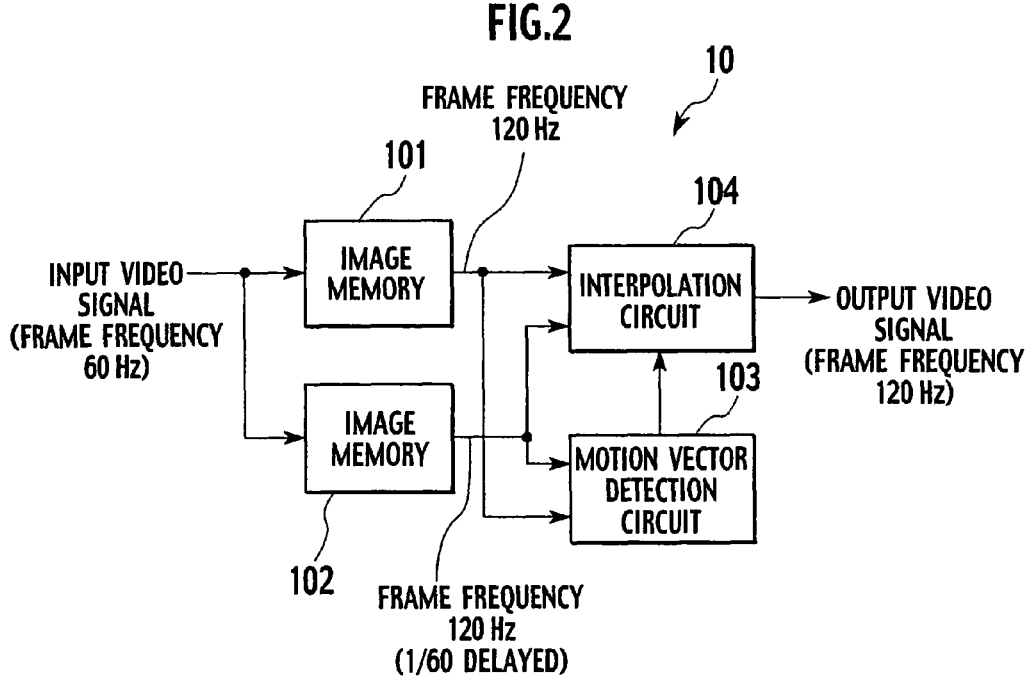
FIG. 2 is a block diagram showing a concrete structural example of a frame rate conversion circuit depicted in FIG. 1.
Figure 3:
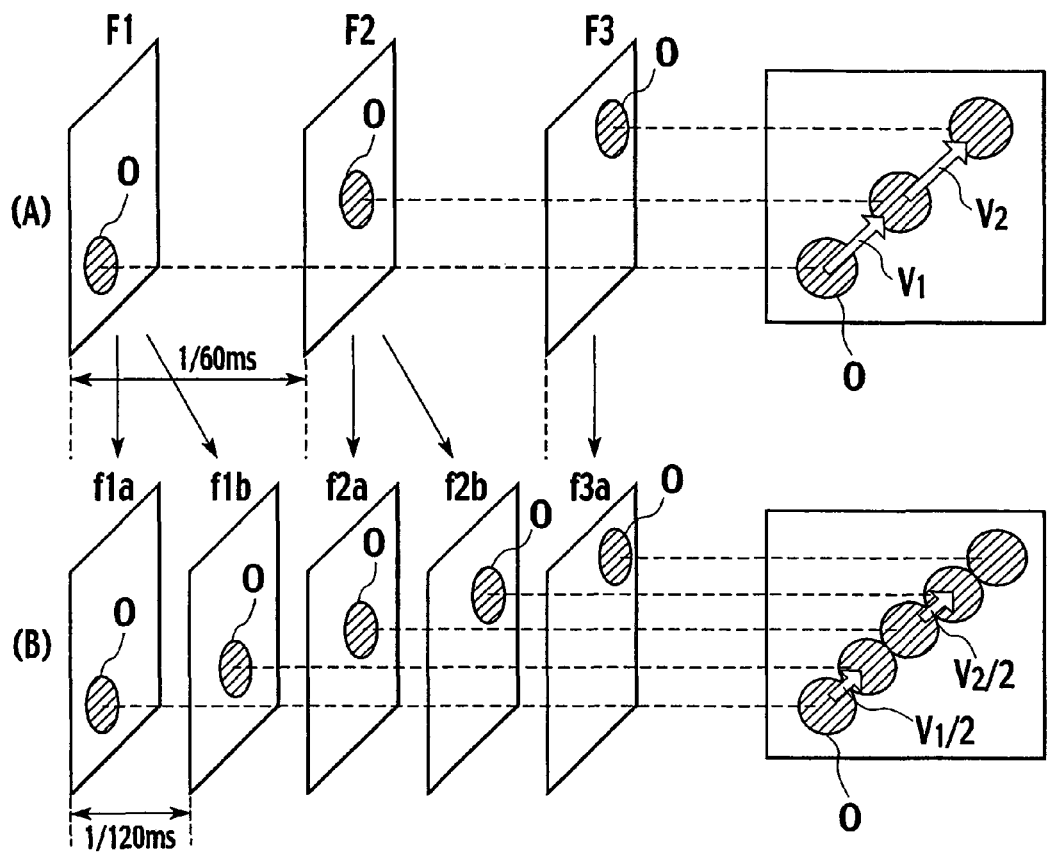
FIG. 3 is a view illustrating an operation of the frame rate conversion circuit depicted in FIG. 1.

FIG. 2 is a block diagram showing a concrete structural example of the frame rate conversion circuit 10 depicted in FIG. 1. FIG. 3 is a view illustrating an operation of the frame rate conversion circuit 10 illustrated in FIG. 1.

As an example, the frame frequency conversion circuit 10 is constituted as shown in FIG. 2. In FIG. 2, the input video signal is written in image memories 101 and 102. Image data corresponding to one frame from each of the image memories 101 and 102, i.e., a total of two frames are simultaneously read at a speed which is twofold of a writing speed. However, the image data output from the image memory 102 is delayed for 1/60 second with respect to the image data output from the image memory 101.

The image data output from the image memories 101 and 102 is supplied to a motion vector detection circuit 103 and an interpolation circuit 104. The motion vector detection circuit 103 detects a motion vector between frames by using, e.g., a matching method. The interpolation circuit 104 performs a motion compensation interpolation by using the image data corresponding to two frames read from the image memories 101 and 102 and motion vector data from the motion vector detection circuit 103, and outputs a video signal having a frame frequency of 120 Hz.

The motion compensation interpolation in the interpolation circuit 104 carries out vector transfer as shown in FIG. 3 based on the fact that a conversion rate of the frame frequency is twofold. In FIG. 3, (A) shows an input video signal to the interpolation circuit 104, and (B) shows an output video signal from the interpolation circuit 104. It is assumed that F1, F2, F3 . . . are frame numbers of the input video signal, and f1a, f1b, f2a, f2b, f3a . . . are frame numbers of the output video signal. Since conversion from the frame F1 into the frame f1a, conversion from the frame F2 into the frame f2a and conversion from the frame F3 into the frame f3a are matched with each other in time phase, vector transfer is not performed. The frame f1b is inserted between the frames F1 and F2 by performing vector transfer, and the frame f2b is inserted between frames F2 and F3 by effecting vector transfer.

The right-hand side of (A) and (B) in FIG. 3 shows how an object O moves across the frames f1a to f3a. In (A) of FIG. 3, the object O moves from a position in the frame F1 to a position in the frame F2 based on a vector $V_1$, and further moves from the position in the frame F2 to a position in the frame F3 based on the vector $V_2$. In (B) of FIG. 3, positions of the object O in the frames f1a, f2a and f3a are respectively the same as those in the frames F1, F2 and F3. Moving an image of the frame F1 by a distance of $V_1/2$ can suffice in order to generate an image of the frame f1b, and moving an image of the frame F2 by a distance of $V_2/2$ can suffice in order to generate an image of the frame f2b.

In the example shown in FIG. 3, image data of the frame F1 alone is used when generating the frame f1b and image data of the frame F2 alone is used when generating the frame f2b, but the adjacent frames may be mixed. Image data of the frames 30 F1 and F3 may be combined with each other. In this case, the frame f1b can be obtained by calculating F1' acquired by moving the image of the frame F1 by a distance of $V_1/2$ and F2' acquired by moving the image of the frame F2 by a distance of $-V_1/2$ and mixing F1' and F2' at a rate of 1:1. The mixing rate described herein is an example, and it is not restricted to this example.

When interpolation is carried out by using not only one frame but a plurality of frames in case of generating a frame of the output video signal in this manner, there can be obtained an advantage that noises can be reduced.

Figure 4:
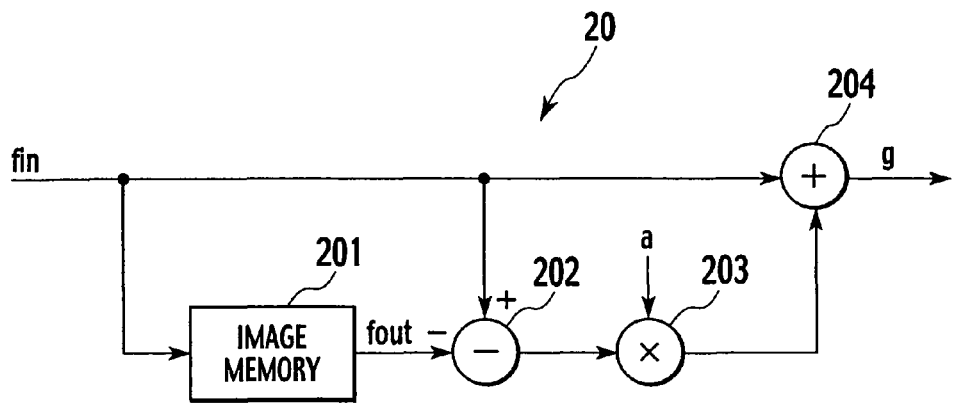
FIG. 4 is a block diagram showing a concrete structural example of a time base emphasizing circuit depicted in FIG. 1.

FIG. 4 is a block diagram showing a concrete structural example of the time base emphasizing circuit 20 depicted in FIG. 1.

As an example, the time base emphasizing circuit 20 is constituted as shown in FIG. 4. In FIG. 4, assuming that fin is a video signal having a frame frequency of 120 Hz output from the frame rate conversion circuit 10, the video signal fin is input to an image memory 201, and output as a video signal fout which is delayed for one frame. A subtracter 202 subtracts the video signal fout from the video signal fin, and supplies a difference between the video signal fin and the video signal fout to a multiplier 203. The multiplier 203 multiplies the difference input thereto by a coefficient a, and supplies a result to an adder 204. The adder 204 adds the video signal fin to an output from the multiplier 203, and outputs the added output as an output signal g. The output signal g is represented by the following Expression (1).

$$g = f\text{in} + a(f\text{in} - f\text{out}) \qquad (1)$$

The coefficient a is set in accordance with response characteristics of the liquid crystal. If a response is relatively fast and an after-image quantity is small, a is set small. On the other hand, if the response is slow and the after-image quantity is large, a is set large.

Figure 5A:
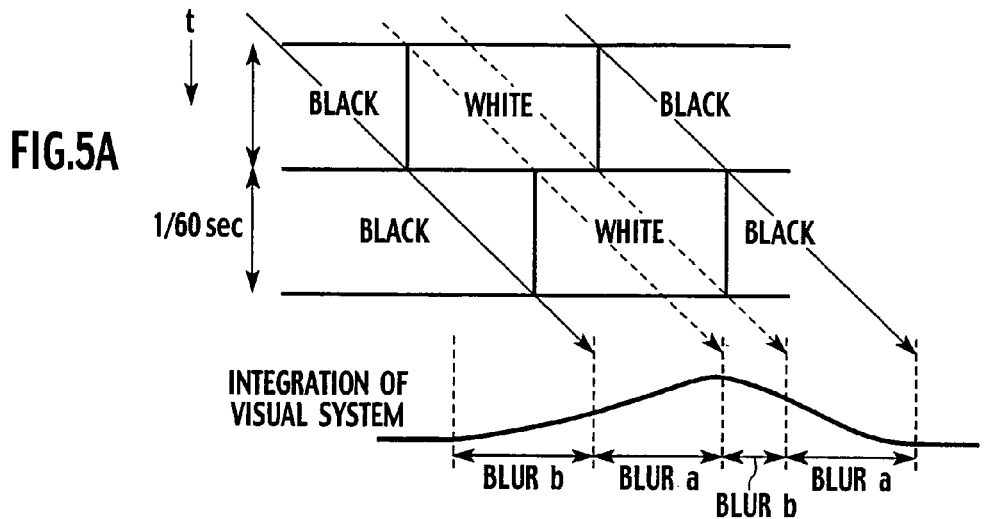
FIGS. 5A to 5C are views illustrating an effect provided by the first embodiment.
Figure 5B:
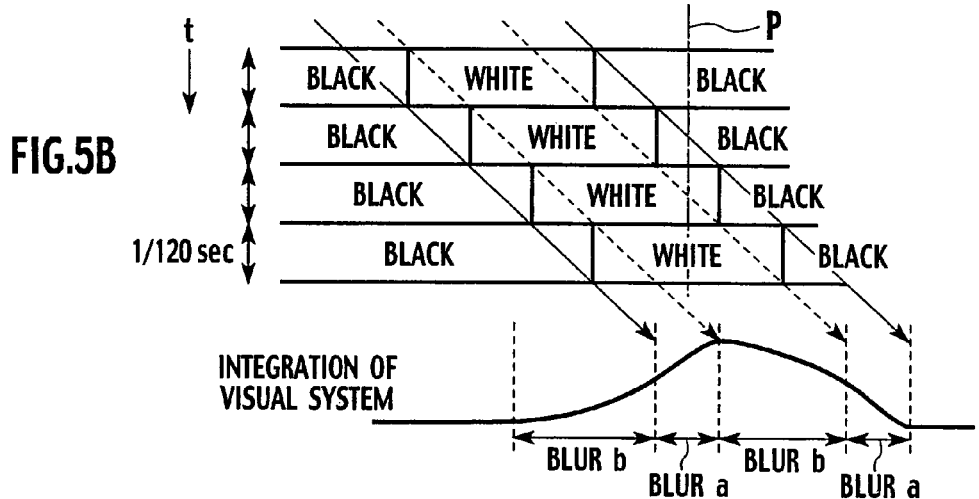
Figure 5C:
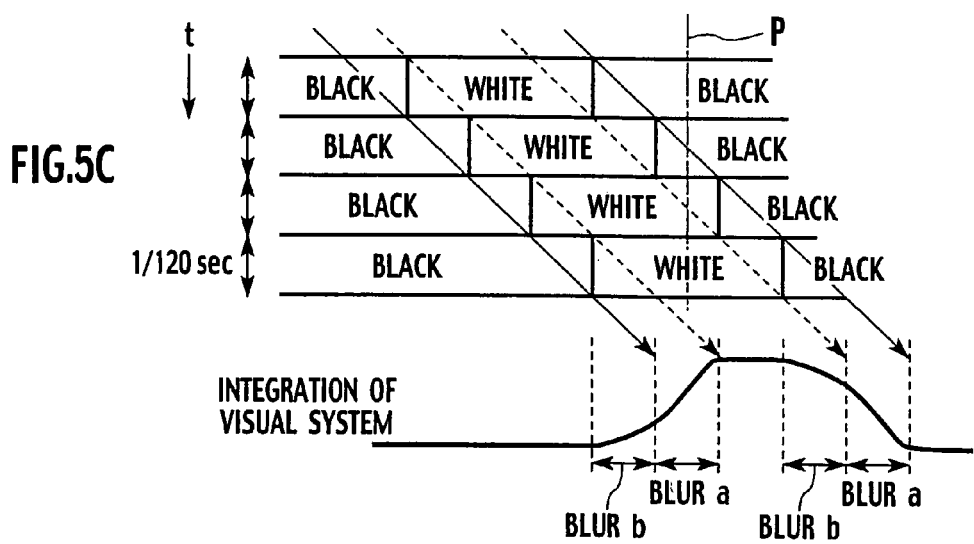

FIGS. 5A to 5C and FIGS. 6A and 6B show effects provided by the first embodiment. FIGS. 5A to 5C show display states when rectangular waveforms aligned in the order of black, white and black move in parallel in the horizontal direction, in which FIG. 5A shows a display state obtained by a video signal having a frame frequency of 60 Hz before frame rate conversion by the frame frequency conversion circuit 10, FIG. 5B shows a display state obtained by a video signal having a frame frequency 120 Hz after frame rate conversion by the frame frequency conversion circuit 10 and before time base emphasis by the time base emphasizing circuit 20, and FIG. 5C shows a display state obtained by a video signal having a frame frequency 120 Hz after frame rate conversion by the frame frequency conversion circuit 10 and time base emphasis by the time base emphasizing circuit 20. As shown in FIGS. 5A to 5C, the rectangular waveforms of black, white and black which move in parallel in the horizontal direction are aligned and shown in a direction of a time t.

When a given frame is switched to a next frame and the rectangular waveforms of black, white and black move in parallel in the horizontal direction, a phenomenon called an integration of a visual system that images are integrated and seen in human eyes occurs at positions where the rectangles are switched from white to black and from black to white. Therefore, as respectively shown in FIGS. 5A to 5C, it can be seen that rectangles are smoothly switched from black to white and from white to black, and a moving image blur occurs. As shown in FIGS. 5A to 5C, the moving image blur due to the integration of the visual system includes a blur a due to performing hold-display and a blur b due to a response speed of the liquid crystal. In FIG. 5A of a frame frequency of 60 Hz, both the blur a and the blur b are large. In FIG. 5B of a frame frequency of 120 Hz, a width of the blur a is narrow, and the moving image blur is improved. However, the blur b is not improved. In FIG. 5C in which the time base emphasis is effected at a frame frequency of 120 Hz, a width of the blur b is also narrow, and the moving image blur is further improved.

Figure 6A:
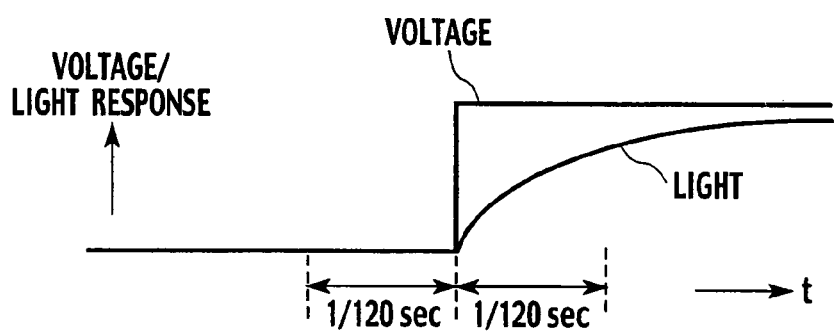
FIGS. 6A and 6B are views illustrating an effect 10 provided, by the first embodiment.
Figure 6B:
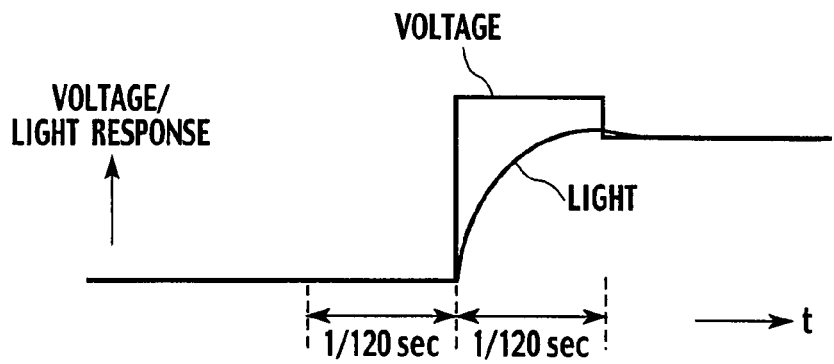

FIGS. 6A and 6B show the voltage/light response in a cross section p indicated by dashed lines in FIGS. 5B and 5C. The voltage/light response is corrected from FIG. 6A to FIG. 6B by the time base emphasis using the time base emphasizing circuit 20, and display characteristics in a frame unit are improved.

Second Embodiment

FIG. 7 is a partial block diagram showing a second embodiment of an image display unit according to the present invention. FIG. 8 is a timing chart illustrating an operation of the second embodiment.

The second embodiment is obtained by improving the concrete structures of the frame rate conversion circuit 10 and the time base emphasizing circuit 20 in FIG. 1. Specifically, the image memory 201 in FIG. 4 is eliminated, and the concrete structure of the frame rate conversion circuit 10 is changed in accordance with the elimination of the image memory 201. The frame rate conversion circuit and the time base emphasizing circuit in the second embodiment will be referred to as a frame rate conversion circuit 10' and a time base emphasizing circuit 20'. In FIG. 7, like reference numerals denote parts equal to those in FIGS. 2 and 4, and the explanation of these parts may be appropriately eliminated in some cases.

In FIG. 7, image data output from image memories 101 and 102 are supplied to a motion vector detection circuit 103 and interpolation circuits 1041 and 1042. The interpolation circuit 1041 is substantially the same as the interpolation circuit 104 depicted in FIG. 2, performs motion compensation interpolation based on image data corresponding to two frames read from the image memories 101 and 102 and motion vector data from the motion vector detection circuit 103, and outputs image data of a current frame. The interpolation circuit 1042 performs motion compensation interpolation based on the image data corresponding to two frames read from the image memories 101 and 102 and the motion vector data from the motion vector detection circuit 103, and outputs image data of a preceding frame.

The image data output from the interpolation circuit 1041 is supplied to a subtracter 202 and an adder 204, and the image data output from the interpolation circuit 1042 is supplied to the subtracter 202.

An operation timing of the frame rate conversion circuit 10' will now be described with reference to FIG. 8. In FIG. 8, (A) shows image data of an input video signal having a frame frequency of 60 Hz, and the same image data is read twice from the image memories 101 and 102 and turned into a video signal having a frame frequency of 120 Hz as shown in (B) and (C). The image data output from the image memory 102 is delayed for 1/60 second with respect to the image data output from the image memory 101. Timings of (B) to (F) in FIG. 8 are shown being shifted from a timing of (A) in FIG. 8 as indicated by a dashed line for the convenience's sake.

The motion vector detection circuit 103 detects motion vectors $V_1, V_1, V_2, V_2$... by using the image data output from the image memories 101 and 102 as shown in FIG. 8(D). As shown in FIG. 8(E), the interpolation circuit 1041 outputs a frame f1b with a frame timing t1a, and outputs a frame f2a with a frame timing t1b. As shown in FIG. 8(F), the interpolation circuit 0142 outputs a frame f1a with a frame timing t1a, and outputs a frame f1b with a frame timing t1b.

As seen from a comparison between (E) and (F) in FIG. 8, since the image data of FIG. 8(F) is delayed for one frame with respect to the image data of FIG. 8(E) in the 120 Hz cycle, the image memory 201 does not have to be provided in the time base emphasizing circuit 20' according to the second embodiment as different from the time base emphasizing circuit 20 shown in FIG. 4. Therefore, the second embodiment can reduce the number of the image memories as compared with the first embodiment, thereby further decreasing a cost.

Third Embodiment

Figure 9:
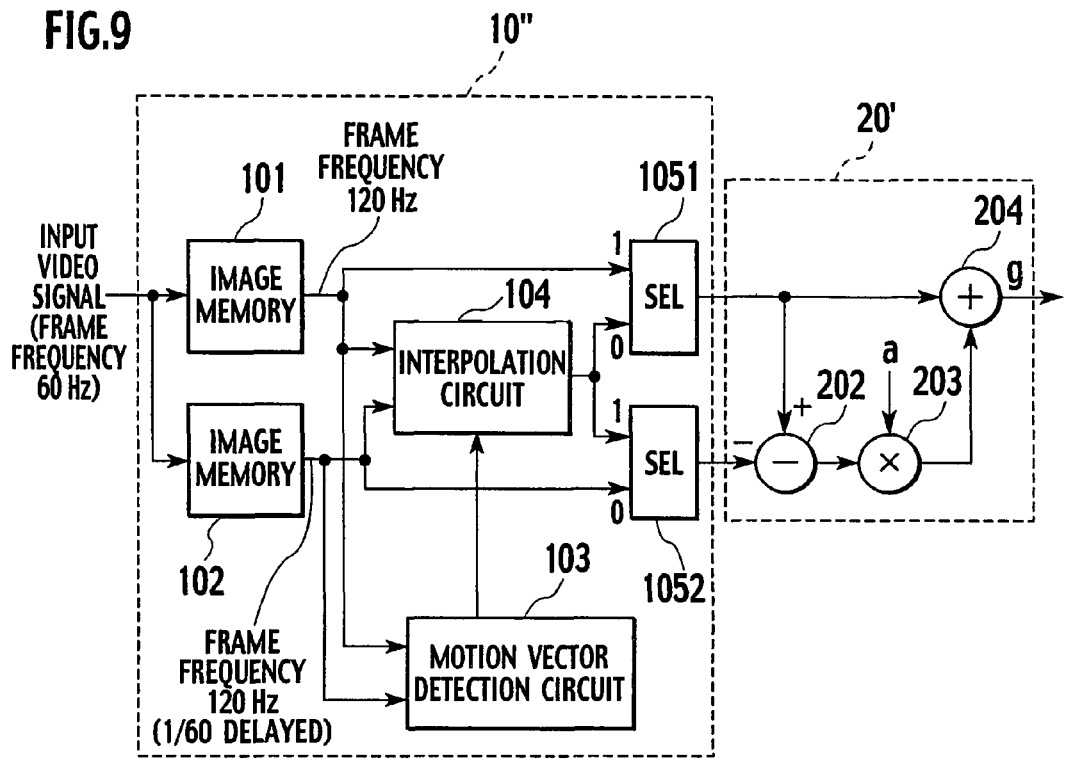
FIG. 9 is a partial block diagram showing a third embodiment of the image display unit according to the present invention.

FIG. 9 is a partial block diagram showing a third 5 embodiment of the image display unit according to the present invention.

The third embodiment can be obtained by further simplifying the frame rate conversion circuit 10' according to the second embodiment, and the frame rate conversion circuit in the third embodiment will be referred to as a frame rate conversion circuit 10". In FIG. 9, like reference numerals denote parts equal to those shown in FIGS. 2, 4 and 7, and the explanation thereof may be appropriately eliminated in some cases.

Image data output from image memories 101 and 102 are supplied to a motion vector detection circuit 103, an interpolation circuit 104 and selectors 1051 and 1052. The image data which was subjected to motion compensation interpolation and output by the interpolation circuit 104 is supplied to the selectors 1051 and 1052.

The image data output from the selector 1051 is supplied to a subtracter 202 and an adder 204, and the image data output from the selector 1052 is supplied to the subtracter 202.

The selectors 1051 and 1052 select a "0" side with the frame timing t1a shown in FIG. 8, and select a "1" size with the frame timing t1b. As described in conjunction with FIG. 3, generation of interpolated images involving vector transfer is restricted to frames f1b, f2b and one of the selectors 1051 and 1052 can output with one frame timing the image data subjected to the interpolation processing based on a result from the motion vector detection circuit 103, thereby obtaining the simplified structure as shown in FIG. 9.

Although the selectors 1051 and 1052 are required in the third embodiment as compared with the second embodiment, the interpolation circuit 104 alone is used as the interpolation circuit whose circuit scale is relatively large, thus further reducing the cost.

Fourth Embodiment

Figure 14A:
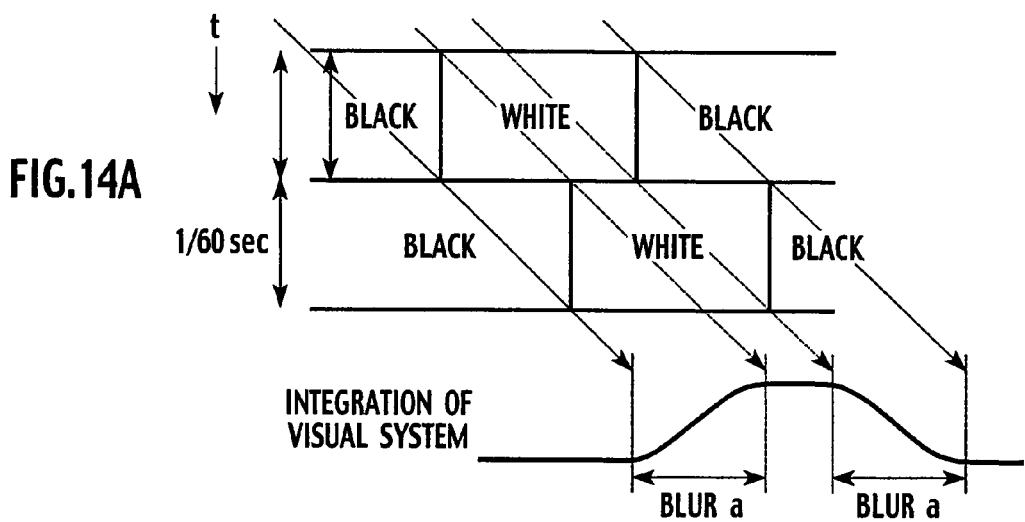
FIGS. 14A to 14C are views illustrating moving picture blurs generated in the hold type display.
Figure 14B:
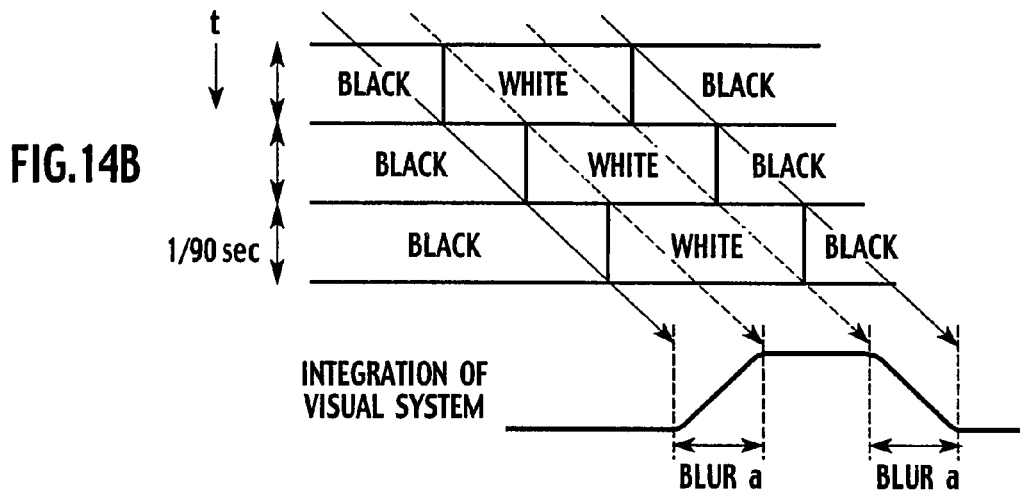
Figure 14C:
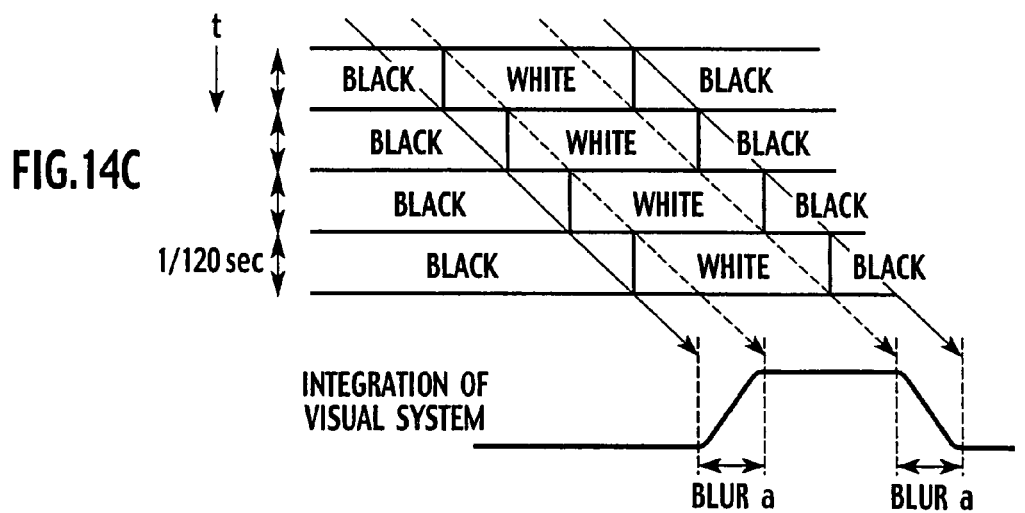

A fourth embodiment solves the first and second problems mentioned above. A description will be freshly given as to generation of a moving image blur in the hold type display unit and a principle of reduction of such a blur with reference to FIGS. 14A to 14C. FIGS. 14A to 14C show a state in which such time base emphasis as described in conjunction with FIGS. 5A to 5C and FIGS. 6A and 6B is not performed and a blur a alone is generated, the blur a being caused due to performing hold-display while ignoring a blur b caused owing to a response speed of the liquid crystal.

FIGS. 14A to 14C show display states when rectangular waves aligned in the order of black, white and black move in parallel in the horizontal direction. It is to be noted that a frame frequency of a video signal (original signal) is determined as 60 Hz in the NTSC mode or the like. FIG. 14A shows a case in which the frame frequency is determined as 60 Hz which is unchanged from that of the original signal, FIG. 14B shows a case in which the frame frequency as a later-described preferred example of the fourth embodiment is determined as 90 Hz which is 3/2-fold of that of the original signal, and FIG. 14C shows a case in which the frame frequency is determined as 120 Hz which is twofold of that of the original signal like the first to third embodiments as described in the cited reference. As shown in FIGS. 14A to 14C, the rectangular waveforms of black, white and black which move in parallel in the horizontal direction are aligned and shown in a direction of a time t.

When a given frame is switched to a next frame and the rectangular waveforms of black, white and black move in parallel in the horizontal direction, since there occurs a phenomenon called integration of a visual system that images are integrated and seen in human eyes at positions where the rectangular waveforms are switched from white to black and from black to white, it can be seen that rectangular waveforms are gently switched from black to white and from white to black as illustrated in FIGS. 14A to 14C, respectively. Therefore, a moving image blur having a width shown in each of FIGS. 14A to 14C is generated. As seen from FIGS. 14A to 14C, the width of the moving image blur becomes small as the frame frequency becomes high. At the frame frequency 120 Hz in FIG. 14C, as described in the cited reference, the same effect as that of intermittent display with a 50% duty can be obtained. At the frame frequency 90 Hz in FIG. 14B, the effect which is substantially the same as that of intermittent display with an approximately 60% duty can be obtained.

As understood from the above description, display is approximated to impulse type display as the frame frequency is increased, and the moving image blurs are reduced. Even if the frame frequency is increased to an integral multiple which exceeds twofold, however, there is a limit in response speed of the liquid crystal, and the effect of increasing the frame frequency is reduced. Therefore, it is not necessarily good to increase the frame frequency as far as possible. Currently, a pixel number of WXGA which forms the mainstream is 1280 dots×768 lines. When a sampling frequency in an effective video period alone is calculated while ignoring a blanking period, the sampling frequency is 118 MHz in case of a frame frequency of 120 Hz. This sampling frequency of 118 MHz is a great burden on an operating speed of a circuit or a connection interface between circuits (e.g., between the frame rate conversion circuit and the drive circuit). Therefore, setting the frame frequency to 120 Hz involves an actual difficulty, and it is hard to adopt this frame frequency in an actual product.

Thus, in the fourth embodiment, a frame frequency (vertical frequency) which can effectively reduce moving image blurs and can be adopted in an actual product is intensely examined. In the fourth embodiment, a frame frequency of an input video signal (original signal) is converted into an m/n-fold frequency. Here, m is an integer of 3 or more, n is an integer of 2 or more, and conditions that m>n, and m/n is not an integer are satisfied. As preferred examples of m and n, m=3 and n=2. In the fourth embodiment which is described below in detail, m=3, n=2, and the frame frequency 60 Hz of the input video signal is converted into 90 Hz. The present inventors confirmed from an experiment that moving image blurs can be sufficiently effectively reduced at the frame frequency of 90 Hz even if the frame frequency is not set to 120 Hz which is described in the cited reference. Considering a display operation capability of the display panel, it is good to set the frame frequency after conversion to 100 Hz or below.

When the frame frequency is 90 Hz, the effect which is substantially the same as that of intermittent display with the approximately 67% duty as described above can be obtained, and this corresponds to an example in which a shutter period is approximately 33%. This shutter period is approximately 5.56 ms in terms of the time. This is considerably large as an improvement level of a response speed of the liquid crystal. Furthermore, when the frame frequency is 90 Hz, a sampling frequency of the video signal is 1.5-fold of a sampling frequency of the original signal, and approximately 88.5 MHz can suffice. The sampling frequency of approximately 88.5 MHz is sufficiently feasible value for an operating speed of the current integrated circuit (IC) and the connection interface between circuits.

Meanwhile, a liquid crystal panel of 1280 dots×720 line (which is a so-called 720P format) is often used. In this case, a sampling frequency at a frame frequency of 90 Hz is approximately 82.9 MHz, this can be easily realized, and it can be understood that it can be adopted in an actual product. It is to be noted that setting the frame frequency to 120 Hz provides the sampling frequency of 110.6 MHz. It is preferable that the sampling frequency of the video signal after frame frequency conversion (frame frequency×vertical line number×horizontal pixel number) is 100 Hz or less. If the sampling frequency is 100 Hz or less, this cannot be an obstacle to an operating speed of the integrated circuit or the connection interface between circuits.

Figure 10:
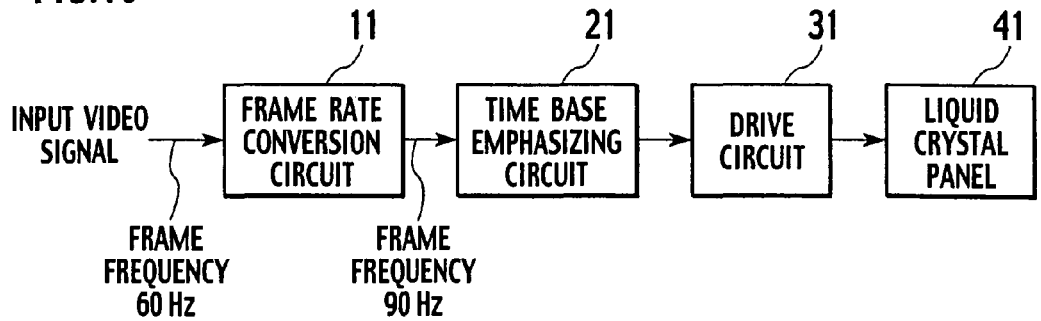
FIG. 10 is a block diagram showing a fourth embodiment of the image display unit according to the present invention.

FIG. 10 is a block diagram showing the fourth embodiment of the image display unit according to the present invention.

An entire structural example of the fourth embodiment is as shown in FIG. 10. In FIG. 10, a video signal which is a sequential scanning signal having a frame frequency of 60 Hz is input to a frame rate conversion circuit 11. The frame rate conversion circuit 11 converts the frame frequency of the input video signal into a 3/2-fold frequency, i.e., 90 Hz, and outputs the converted frequency. The video signal having the frame frequency of 90 Hz is input to a time base emphasizing circuit 21. The time base emphasizing circuit 21 subjects the input video signal to time base emphasis, and outputs the emphasized signal. Concrete structures and operations of the frame rate conversion circuit 11 and the time base emphasizing circuit 21 will be described later. The video signal output from the time base emphasizing circuit 21 is input to a drive circuit 31, and the drive circuit 31 drives a liquid crystal panel 41 as an example of the hold type display unit (display panel) in order to display the video signal having the frame frequency 90 Hz.

Figure 11:
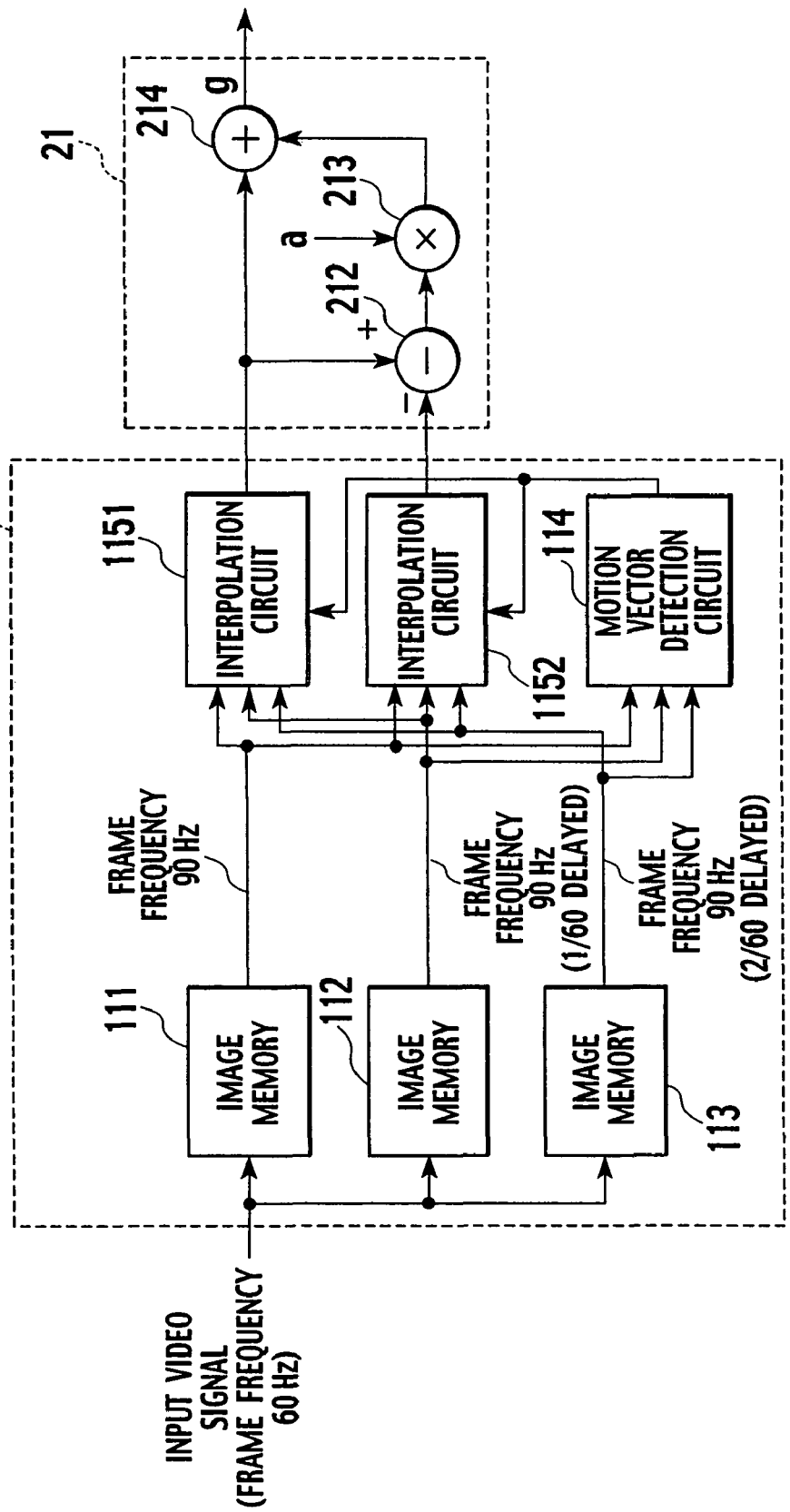
FIG. 11 is a partial block diagram showing a concrete structural example of the fourth embodiment.
Figure 12:
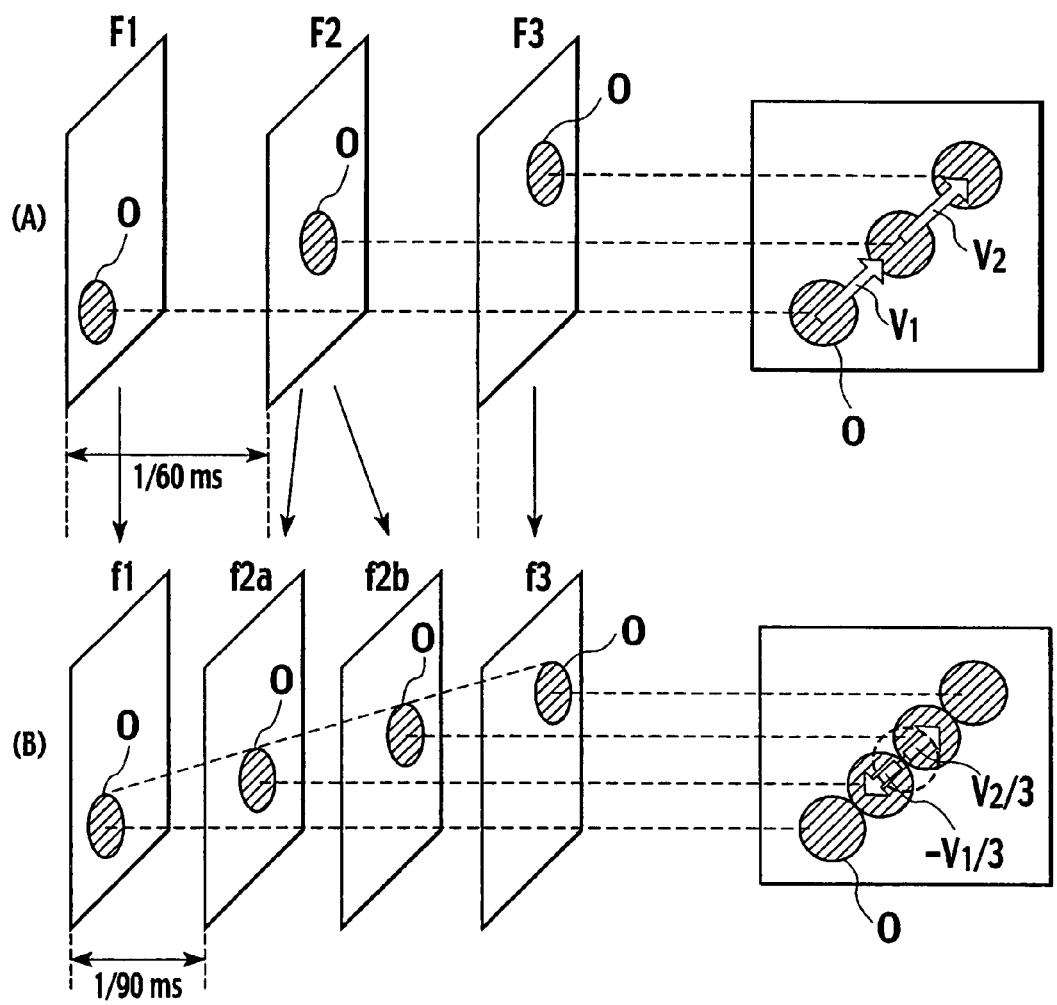
FIG. 12 is a view illustrating an operation of a frame rate conversion circuit depicted in FIG. 10.

FIG. 11 is a partial block diagram showing a concrete structural example of the fourth embodiment. FIG. 12 is a view illustrating an operation of the frame rate conversion circuit depicted in FIG. 10. FIG. 13 is a timing chart illustrating an operation of the fourth embodiment.

The frame rate conversion circuit 11 and the time base emphasizing circuit 12 are configured as shown in FIG. 11 as an example. In FIG. 11, a video signal having a frame frequency of 60 Hz is input to image memories 111 to 113. Image data corresponding to one frame is written in each of the image memories 111 to 113 at a writing frequency 60 Hz, and it is simultaneously read at a reading frequency 90 Hz whose speed is 3/2-fold of that of the input video signal. However, the image data output from the image memory 112 is delayed for 1/60 second with respect to the image data output from the image memory 111, and the image data output from the image memory 113 is delayed for 2/60 second with respect to the image data output from the image memory 111.

The image data read from the image memories 111 to 113 are input to a motion vector detection circuit 114 and interpolation circuits 1151 and 1152. The motion vector detection circuit 114 detects a motion vector between frames based on the image data corresponding to three frames from the image memories 111 to 113 by using a matching method or the like. The interpolation circuits 1151 and 1152 perform motion compensation interpolation by using the image data corresponding to three frames from the image memories 111 to 113 and the motion vector detected by the motion vector detection circuit 12.

The image data output from the interpolation circuit 1151 is supplied to a subtracter 212 and an adder 214, and the image data output from the interpolation circuit 1152 is supplied to the subtracter 212. The time base emphasizing circuit 21 of the fourth embodiment is substantially the same as the time base emphasizing circuit 20' of the second embodiment.

The motion compensation interpolation in the interpolation circuits 1151 and 1152 performs vector transfer as shown in FIG. 12 since a conversion rate of a frame frequency is 3/2-fold. In FIG. 12, (A) shows the input video signal to the interpolation circuits 1151 and 1152, and (B) shows the output video signal from the interpolation circuits 1151 and 1152. It is assumed that F1, F2, F3 are frame numbers of the input video signal, and f1, f2a, f2b, f3 are frame numbers of the output video signal. Since conversion from the frame F1 to the frame f1 and conversion from the frame F3 to the frame f3 are matched with each other in time phase, vector transfer is not carried out. The frame f2a is inserted between the frames F1 and F2 by performing vector transfer, and the frame f2b is inserted between the frames F2 and F3 by effecting vector transfer.

The right-hand side of (A) and (B) in FIG. 12 shows how an object 0 moves across the frames f1 to f3. In FIG. 12(A), the object 0 moves from a position in the frame F1 to a position in the frame F2 based on a motion vector $V_1$, and moves from a position in the frame F2 and a position in the frame F3 based on a motion vector $V_2$. In FIG. 12(B), positions of the object 0 in the frames f1 and f3 are the same as those in the frames F1 and F3. A position of the object 0 in the frame F2 is indicated by a broken line. Moving an image of the frame F2 by a distance of $-V_1/3$ can suffice in order to generate an image of the frame f2a, and moving the image of the frame F2 by a distance of $V_2/3$ can suffice in order to generate an image of the frame f2b.

Although the image data of the frame F2 alone is used when generating the frames f2a and f2b in the example of FIG. 12, image data of the frame F1 may be combined with image data of the frame F3. In this case, the frame f2a can be obtained by calculating F1' acquired by moving an image of the frame F1 by a distance of $V_i \times 2/3$ and F2' acquired by moving the image of the frame F2 by a distance of $-V_i \times 1/3$, and mixing F1' and F2' at a rate of 1:2. Moreover, the frame f2b can be obtained by calculating F2' acquired by moving the image of the frame F2 by a distance of $V_2 \times 1/3$ and F3' acquired by moving an image of the frame F3 by a distance of $-V_2 \times 2/3$, and mixing F2" and F3' at a rate of 2:1.

The mixing rates described herein are just examples, and they are not restricted to these examples. In case of generating a frame of the output video, signal, when interpolation is carried out with respect to not only a closest frame but also a frame adjacent to this frame in this manner, there can be obtained an effect that noises can be reduced.

An operation timing of the frame rate conversion circuit 11 will now be described with reference to FIG. 13. In FIG. 13, (A) shows image data of an input video signal having a frame frequency of 60 Hz, and image data are read from the image memories 113 to 111 and turned into video signals having a frame frequency of 90 Hz as shown in (B) to (D). Timings of (B) to (F) in FIG. 13 are illustrated being shifted with respect to a timing of (A) in FIG. 13 as indicated by a dashed line for the convenience's sake.

As apparent from (E) and (F) in FIG. 13, the image data output from the interpolation circuit 1152 is delayed for one frame at a rate of the frame frequency 90 Hz with respect to the image data output from the interpolation circuit 1151. As a result, in the fourth embodiment, the image memories do not have to be provided in the time base emphasizing circuit 21 like the second embodiment.

As another example of the fourth embodiment, there can be considered conversion of the frame frequency into 80 Hz while setting m/n to 4/3-fold, conversion of the frame frequency into 75 Hz while setting m/n to 5/4-fold, conversion of the frame frequency into 72 Hz while setting m/n to 6/5-fold, and others. The fourth embodiment does not give an operation destabilizing factor to the display panel as compared with the example using means for shutting the backlight described in the cited reference, which is advantageous. Additionally, as described above, the fourth embodiment does not impose a great burden on the circuit operation, which is practically very effective.

As still another example of the fourth embodiment, the frame rate conversion circuit 11 and the time base emphasizing circuit 21 can have a structure in which the number of interpolation circuit is one by using the selectors like the third embodiment shown in FIG. 9.

According to the present invention, moving image blurs can be reduced without impairing advantages of the hold type display which can perform display with no flicker. The present invention can be readily realized with a reduced burden on an operating speed of a circuit or a connection interface between circuits. Further, since a special circuit such as one which shuts the backlight, is not required, thereby suppressing an increase in cost.

It should be understood that many modifications and adaptations of the invention will become apparent to those skilled in the art and it is intended to encompass such obvious modifications and changes in the scope of the claims appended hereto.

What is claimed is:

1. An image display method for use in an image display unit including an active matrix type display panel, comprising:
    writing a video signal having a first vertical frequency into an image memory at a first speed;
    reading the video signal as image data from the image memory at a second speed which is m/n-fold (wherein m is an integer of 2 or more, n is an integer of 1 or more, and conditions of m>n are satisfied) of the first speed;
    detecting a motion vector by using the image data read from the image memory;
    performing motion compensation interpolation by using the image data read from the image memory and the motion vector so as to generate respective image data each being a video signal having a second vertical frequency which is m/n-fold of the first vertical frequency and shifted as much as one frame from the other;
    emphasizing a high-zone component in a direction of the time base by using the output respective image data corresponding to at least two adjacent frames in the video signal having the second vertical frequency; and
    displaying the video signal having the second vertical frequency and the emphasized high-zone component in the direction of the time base on the active matrix type display panel.

2. An image display method for use in an image display unit including an active matrix type display panel, comprising:
    writing a video signal having a first vertical frequency into an image memory at a first speed;
    reading the video signal as image data from the image memory at a second speed which is m/n-fold (wherein m is an integer of 2 or more, n is an integer of 1 or more, and conditions of m>n are satisfied) of the first speed;
    detecting a motion vector by using the image data read from the image memory;
    performing motion compensation interpolation by using the image data output from the image memory and the motion vector so as to generate a video signal having a second vertical frequency which is m/n-fold of the first vertical frequency and shifted as much as one frame from the other;
    selecting the image data output from the image memory or the image data applied with the motion compensation interpolation so as to generate respective image data each being shifted as much as one frame from the other;
    emphasizing a high-zone component in a direction of the time base by using the output respective image data corresponding to at least two adjacent frames in the video signal having the second vertical frequency; and
    displaying the video signal having the second vertical frequency and the emphasized high-zone component in the direction of the time base on the active matrix type display panel.

* * * * *